May 31, 1932. R. H. KRUEGER ET AL 1,860,544
GAS ANALYSIS APPARATUS
Filed July 26, 1930
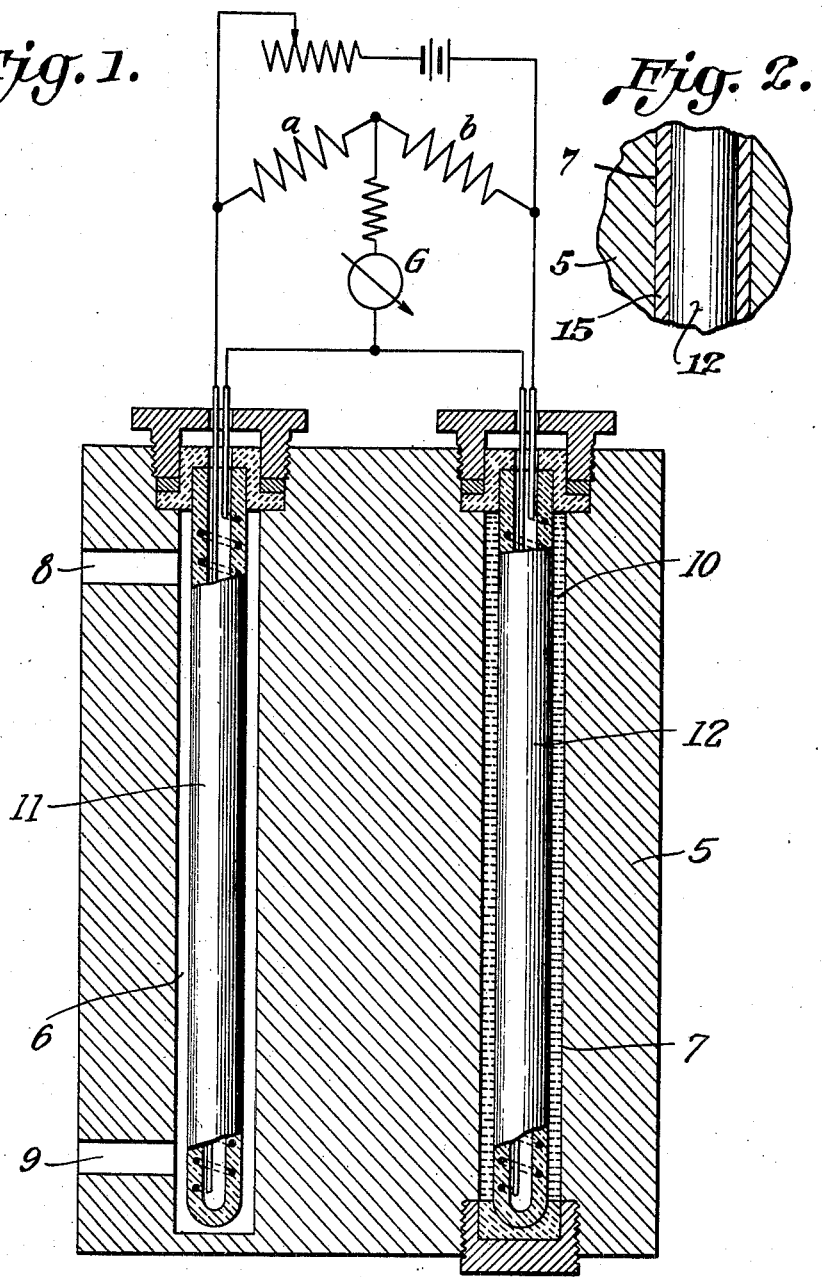

Patented May 31, 1932

1,860,544

UNITED STATES PATENT OFFICE

RICHARD H. KRUEGER AND JOHN HENRY OETJEN, OF NEWARK, NEW JERSEY, ASSIGNORS TO CHARLES ENGELHARD INC., OF NEWARK, NEW JERSEY, A CORPORATION OF NEW JERSEY

GAS ANALYSIS APPARATUS

Application filed July 26, 1930. Serial No. 470,787.

This invention relates to apparatus for analyzing gases by the thermal conductivity method.

Heretofore, the usual apparatus for analyzing gases by the thermal conductivity method has included a cell containing a standard or reference gas, and a second cell through which is passed the gas being analyzed. In each cell is positioned a resistance heating element, which elements form branches of a Wheatstone bridge.

When the gases surrounding the resistance heating elements are identical, heat is conducted from the elements at the same rate, and the balance of the Wheatstone bridge is not disturbed. However, if the thermal conductivity of the gases is different, the heat will be conducted from one heating element at a greater rate than it will be conducted from the other heating element, and the balance of the Wheatstone bridge will be destroyed, due to the increase in resistance of one element resulting from a rise in temperature. The amount of unbalance of the Wheatstone bridge indicates the difference in thermal conductivity between the standard gas and the gas being analyzed.

Gases used as standards or reference gases are different depending upon the gas being analyzed. For example, when analyzing carbon dioxide in air, the standard cell is filled with air as a reference gas. When the carbon dioxide impurity in hydrogen is to be determined, hydrogen is used as the standard gas and when the hydrogen impurity in oxygen is to be determined, pure oxygen is used as the standard gas.

However, the use of gases as standards is objectionable in that hydrogen and gases of similar atomic structure diffuse through metals having the slightest degree of porosity, and also through cements and other compounds which may be used for sealing purposes. Accordingly it is practically impossible to maintain a perfect seal to properly hold a reference gas in a standard cell for a reasonable length of time, that is, for a year or more.

It is, therefore, an object of this invention to provide a gas analyzing apparatus in which a standard cell is filled with a liquid or a solid compound instead of a gas.

A further object is the provision of means in a gas analysis apparatus by means of which the manufacture thereof may be simplified and the cost thereof reduced.

These and other advantageous objects, are attained by the arrangement and combination of parts hereinafter described, and illustrated by the accompanying drawings, which forms a material part of this disclosure.

Figure 1 shows a cross-sectional view of a gas analysis apparatus embodying the invention.

Figure 2 shows a modified form in which a standard cell is filled with a solid.

Referring to the drawings, the gas analysis apparatus is shown to include a block 5 of conducting material, having a standard cell 7 and a cell 6 through which the gas being analyzed is passed. The gas being analyzed is introduced to the cell 6 through a passage 9 and after passing over the resistance heating element 11 in the cell 6, the gas is expelled through a passage 8.

The standard cell 7 has positioned therein a resistance heating element 12, similar to the element 11, and the elements 11 and 12, form branches of a Wheatstone bridge, having the resistances $a$ and $b$, and a galvanometer G.

The elements 11 and 12 are identical in construction, and each comprises, preferably, a coil of platinum wire embedded in the walls of a quartz tube. However, it is obvious that my invention may be effectively used with wires of other metals, and that it is not imperative that the quartz tube be used.

The standad cell 7 is filled with a liquid 10 of known conductivity, or it may be filled with a solid 15, (see Figure 2), of known conductivity. However, gas is not used in the standard cell.

It has been found that bees-wax, turpentine, and xylene bees-wax, have thermal conductivity properties comparable with the thermal conductivity properties of pure hydrogen and hydrogen-nitrogen ratios. Consequently, instead of using a gas as a standard in the reference cell 7, a liquid such as turpentine, or a solid such as bees-wax etc.

may be used. It has also been noted that liquids such as Nujol have a thermal conductivity similar to that of three parts hydrogen and one part nitrogen. Cotton has a thermal conductivity corresponding to pure carbon dioxide.

By using liquids or solids in the standard cell as above set forth, the time of filling the cell is lessened, as accurate analysis by means of complicated checking apparatus is not necessary as when a gas is employed.

The careful grinding and polishing of sealing-in joints are eliminated, as the high viscosity of liquids compared with gases, make it possible to satisfactorily use ordinary machine fittings.

Large quantities of the liquid or solid standard compounds may be made in reserve for future use. This is not practicable with gases because of the danger of the high thermal conductivity gases changing composition due to diffusion.

The sealing in of gases in a standard cell requires a skilled technician because of the extreme care necessary to prevent diffusion or the admission of other gases during the sealing operation. Liquids and solids do not require such careful attention.

When gas is used as a standard, gradual diffusion of the gas from the standard cell causes considerable error, and incorrect indications. In some cases, errors in the analysis of a gas may result in loss of large sums of money in equipment and products. Liquids or compounds have substantially stable characteristics, and any variance therefrom would be inappreciable and cause an inconsequential error.

From the above description, it will be seen that there has been provided a highly efficient gas analysis apparatus in which a standard cell is provided with a medium having equivalent thermal conductivity properties to a gas filled standard cell.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described our invention, what we claim as new and desire to secure by Letters Patent, is:

1. In a gas analysis apparatus of the thermal conductivity type, a standard cell, a resistance heating element mounted therein, and turpentine surrounding the heating element and filling the cell.

2. In a gas analysis apparatus of the thermal conductivity type, a standard cell, a resistance heating element mounted therein, and beeswax surrounding the heating element and filling the cell.

3. In a gas analysis apparatus of the thermal conductivity type, a standard cell, a resistance element mounted therein, and cotton surrounding the heating element and filling the cell.

4. A gas analysis apparatus comprising a standard cell, an analysis cell, a Wheatstone bridge, and a resistance heating element in each cell forming branches of the Wheatstone bridge, thereby characterized, that a non-gaseous substance having thermal conductivity properties equivalent to those of a standard gas is used as the standard or reference material in the standard cell.

RICHARD HENRY KRUEGER.
JOHN HENRY OETJEN.